(12) United States Patent
Matsuo et al.

(10) Patent No.: US 6,203,104 B1
(45) Date of Patent: Mar. 20, 2001

(54) STORAGE STRUCTURE FOR HEAD REST

(75) Inventors: Takashi Matsuo; Harumi Matsuo, both of Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 09/170,716

(22) Filed: Oct. 13, 1998

(30) Foreign Application Priority Data

Oct. 13, 1997 (JP) .................................................. 9-278426

(51) Int. Cl.⁷ ...................................................... A47C 7/62
(52) U.S. Cl. .................. 297/188.1; 297/391; 297/378.1; 297/335
(58) Field of Search .......................... 297/188.04, 188.01, 297/391, 397, 403, 378.1, 316, 331, 335, 248, 188.08, 188.09, 188.1, 451.11, 452.55, 440.1, 440.24

(56) References Cited

U.S. PATENT DOCUMENTS

| | | | |
|---|---|---|---|
| 655,209 | * 8/1900 | Dooley | 297/188.08 |
| 1,709,200 | * 4/1929 | Westbrook et al. | 297/188.08 |
| 3,429,615 | * 2/1969 | Belk | 297/397 X |
| 4,376,552 | * 3/1983 | Pilhall | 297/378.1 X |
| 5,139,310 | * 8/1992 | Itoh | 297/391 |
| 5,273,336 | * 12/1993 | Schubring et al. | 297/378.1 X |
| 5,522,645 | * 6/1996 | Dahlbacka | 297/452.55 |
| 5,551,750 | * 9/1996 | Yoshimura | 297/391 X |
| 5,690,387 | * 11/1997 | Sarti | 297/397 |
| 5,795,023 | * 8/1998 | Kayumi | 297/331 |
| 5,816,650 | * 10/1998 | Lucas, Jr. | 297/188.1 |

* cited by examiner

Primary Examiner—Milton Nelson, Jr.
(74) Attorney, Agent, or Firm—Alston & Bird LLP

(57) ABSTRACT

In a storage structure for a head rest designed in such a way that with a seat cushion pulled up and frontward and a head rest detached, a seat back is to be folded frontward and stays of the head rest are to be fitted in the seat cushion, a back of the seat cushion is formed by a resin panel integrally provided with cylindrical portions, which have bottoms and hold the stays of the head rest.

10 Claims, 5 Drawing Sheets

STORAGE STRUCTURE FOR HEAD REST

FIELD OF THE INVENTION AND RELATED ART STATEMENT

The present invention relates to a storage structure for a head rest of an automobile.

Some of conventional 4-wheel automobiles are equipped with a rear seat of a double folding type which is designed in such a manner that with a head rest removed, a seat cushion and a seat back are folded. In this type of automobile, as shown in FIGS. 4 through 7, a seat cushion 52 or 62 of a rear seat 51 or 61 is pulled frontward of the automobile after which with a head rest 53 or 63 detached, a seat back 54 or 64 is folded frontward, and stays 53a or 63a of the head rest 53 or 63 removed from the seat back 54 or 64 are fitted in the seat cushion 52 or 62. This provides wider baggage space at the back of the vehicle.

The reason why the head rest 53 or 63 is designed detachable from the seat back 54 or 64 is to avoid the following inconvenience. If the head rest 53 or 63 were attached to the upper end of the seat back 54 or 64, the head rest 53 or 63 would interfere with the seat cushion 52 or 62, pulled up in front of the head rest 53 or 63, at the time of folding the seat back 54 or 64 frontward. Further, if the detached head rest 53 or 63 is left as it is inside the automobile, the head rest 53 or 63 may easily be damaged or stained. To prevent it, the head rest 53 or 63 is stored in the seat cushion 52 or 62.

FIGS. 4 and 5 exemplify the storage structure for a head rest. The seat cushion 52 in the figures comprises a urethane pad 55, a metal panel 56 and a molded carpet 57. Provided at the rear end of the urethane pad 55 are support holes 58 where the stays 53a of the head rest 53 are to be inserted, with grommets 59 attached to openings 58a of the metal panel 56 and the molded carpet 57, which correspond to the support holes 58.

As the head rest 53 is held high its stays 53a can be inserted into the grommets 59 and the support holes 58 from above, and therefore, the head rest 53 is held on the seat cushion 52.

FIGS. 6 and 7 show another example of the storage structure for a head rest. The seat cushion 62 in these figures comprises a urethane pad 65 and a carpet 66. A webbing 67 is sewed onto and across the carpet 66 at the back of the seat cushion 62 so that two openings open to the top and bottom are formed.

As the head rest 63 is held high its stays 63a can be inserted into the openings of the webbing 67 from above, and therefore, the head rest 63 is held on the seat cushion 62.

Because the above-described conventional storage structures require the grommets 59 or the webbing 67 separate from the seat cushion 52 or 62 in order to hold the stays 53a or 63a of the head rest 53 or 63 as shown in FIGS. 4–7; however, they suffer an increased number of components and an increased cost. Further, as the stays 53a or 63a of the head rest 53 or 63 are to be fitted into the urethane pad 55 or 65 and the carpet 57 or 66 which are soft, their power of holding the stays 53a or 63a is likely to become lower due to their time-dependent stretching or fatigue, and the appearance of the storage structure holding the head rest 53 or 63 is apt to get worse.

OBJECT AND SUMMARY OF THE INVENTION

Accordingly, it is an object of the present invention to provide a storage structure for a head rest, which can surely hold the stays of the head rest and contribute to a reduction of the number of components and cost.

To achieve the above object, according to this invention, a storage structure for a head rest designed in such a way that with a seat cushion pulled up and frontward and a head rest detached, a seat back is to be folded frontward and stays of the head rest are to be fitted in the seat cushion, is characterized in that the back of the seat cushion is formed by a resin panel integrally provided with cylindrical portions for holding the stays of the head rest, with the cylindrical portions having bottoms.

This structure eliminates the need for separate components for holding the stays as required by the conventional storage structures, thus resulting in fewer components, and can contribute to improvement of the recycle usage and cost reduction. As the cylindrical portions are provided in the storage structure of this invention by making a good use of the property of a resin member, the head rest can be stored firmly for a long period of time.

According to the storage structure embodying this invention, a bead portion protruding inward may be provided at a vertical midway of each cylindrical portion, or a plurality of windows may be provided at intervals therebetween in the outer surface of, and along, each cylindrical portion. It is therefore possible to hold the stays of the head rest more firmly while suppressing rattling of the held head rest during driving. It is also possible to check how the stays are inserted and improve the head-rest storage capability.

DETAILED DESCRIPTION OF THE PREFERRED EMBODIMENTS

A preferred embodiment of the present invention will now be described with reference to the accompanying drawings.

Figure 1:
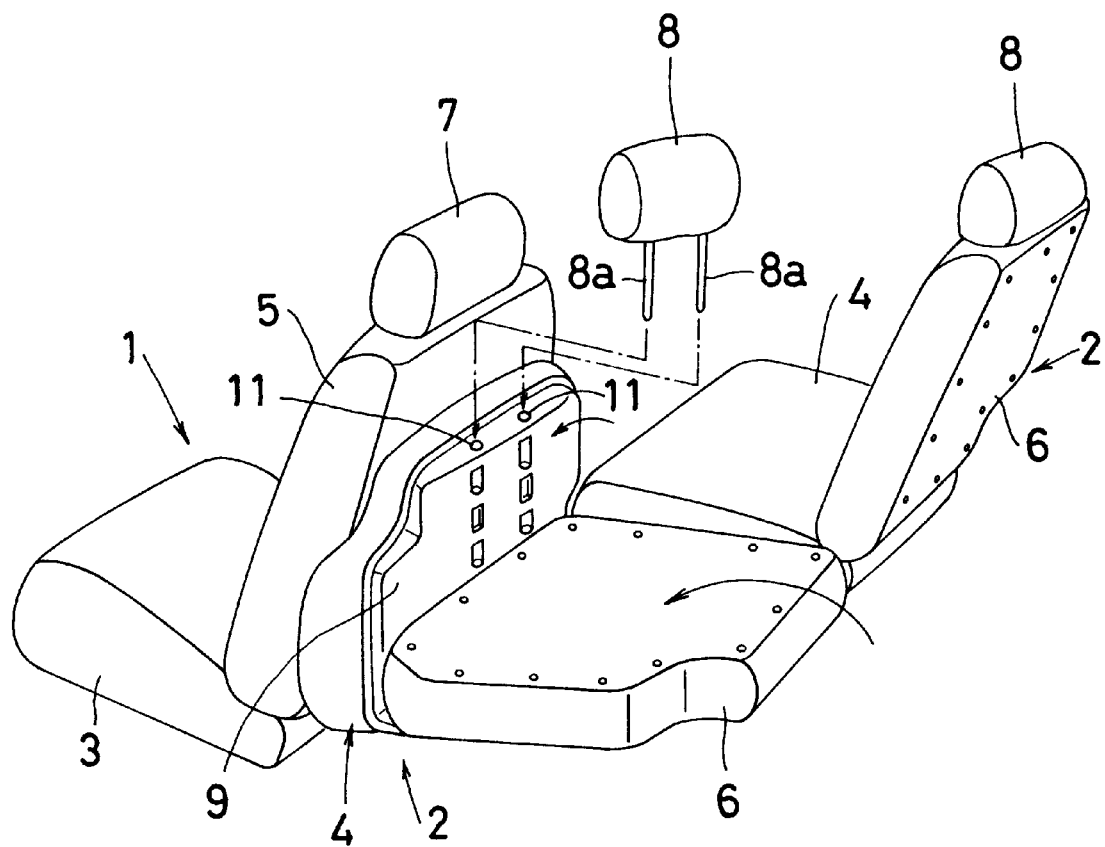
FIG. 1 is a perspective view of a head rest storage structure according to one embodiment of this invention, illustrating a seat cushion pulled up and frontward and a seat back folded frontward but before the stays of the head rest are fitted in the seat cushion.
Figure 2:
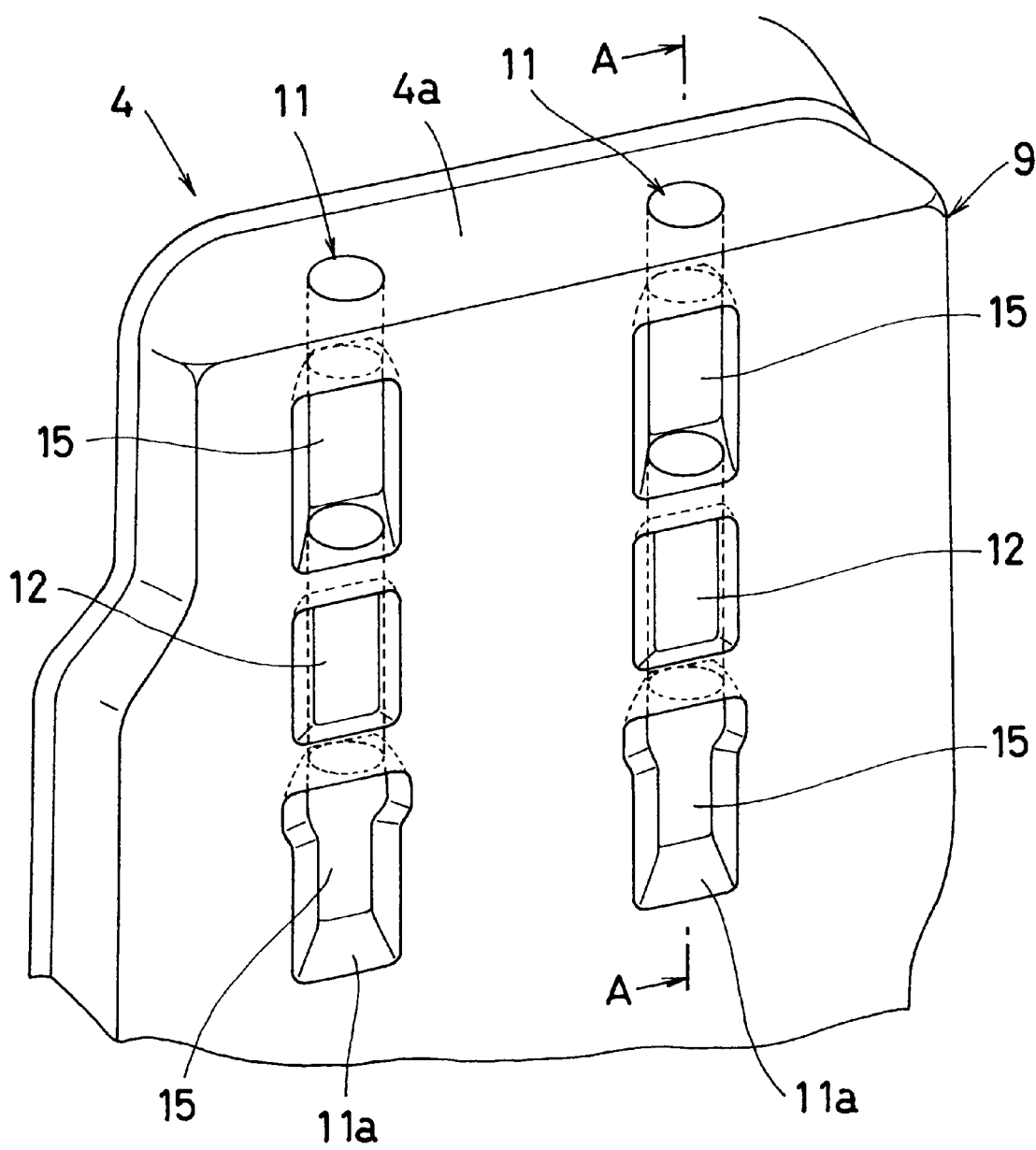
FIG. 2 is a perspective view showing in enlargement the seat cushion in the state of FIG. 1.
Figure 3:
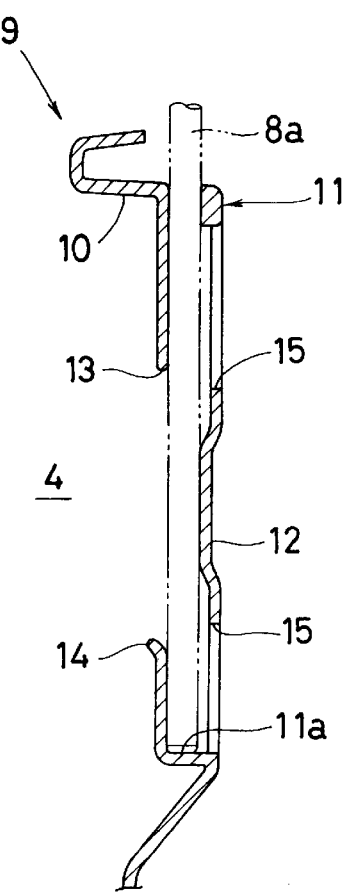
FIG. 3 is a cross-sectional view along the line A—A in FIG. 2.
Figure 4:
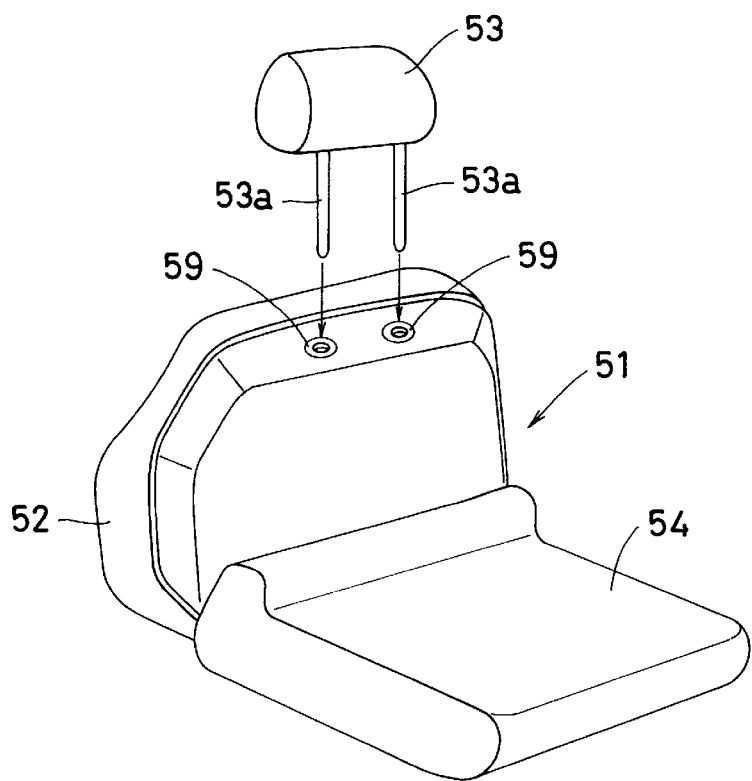
FIG. 4 is a perspective view of a conventional head rest storage structure, showing a seat cushion pulled up and frontward and a seat back folded frontward but before the stays of the head rest are fitted in the seat cushion.
Figure 5:
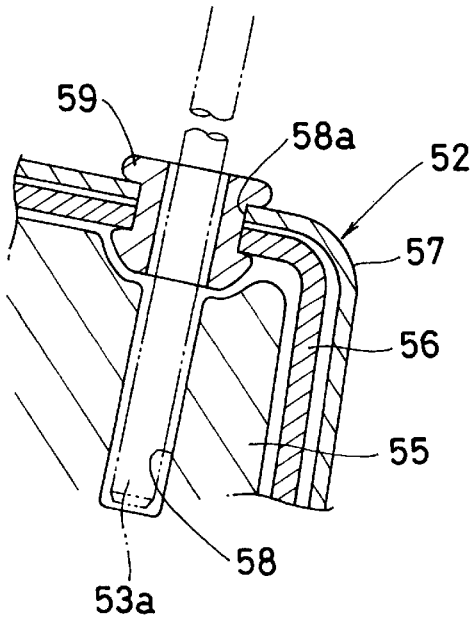
FIG. 5 is a cross-sectional view depicting in enlargement a part of the seat cushion in FIG. 4 where the stays of the head rest are to be fitted.
Figure 6:
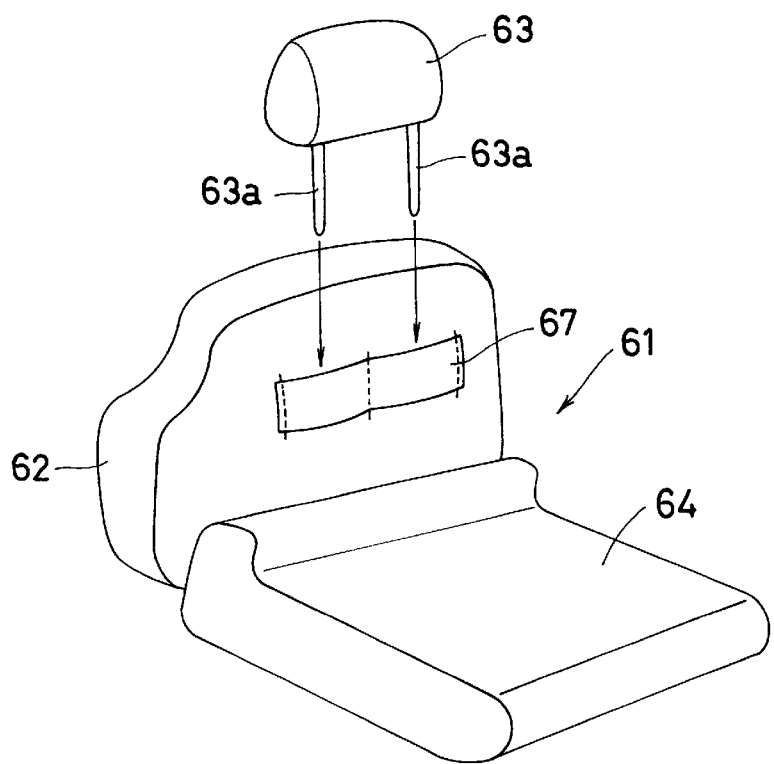
FIG. 6 is a perspective view of another conventional head rest storage structure, showing a seat cushion pulled up and frontward and a seat back folded frontward but before the stays of the head rest are fitted in the seat cushion.
Figure 7:
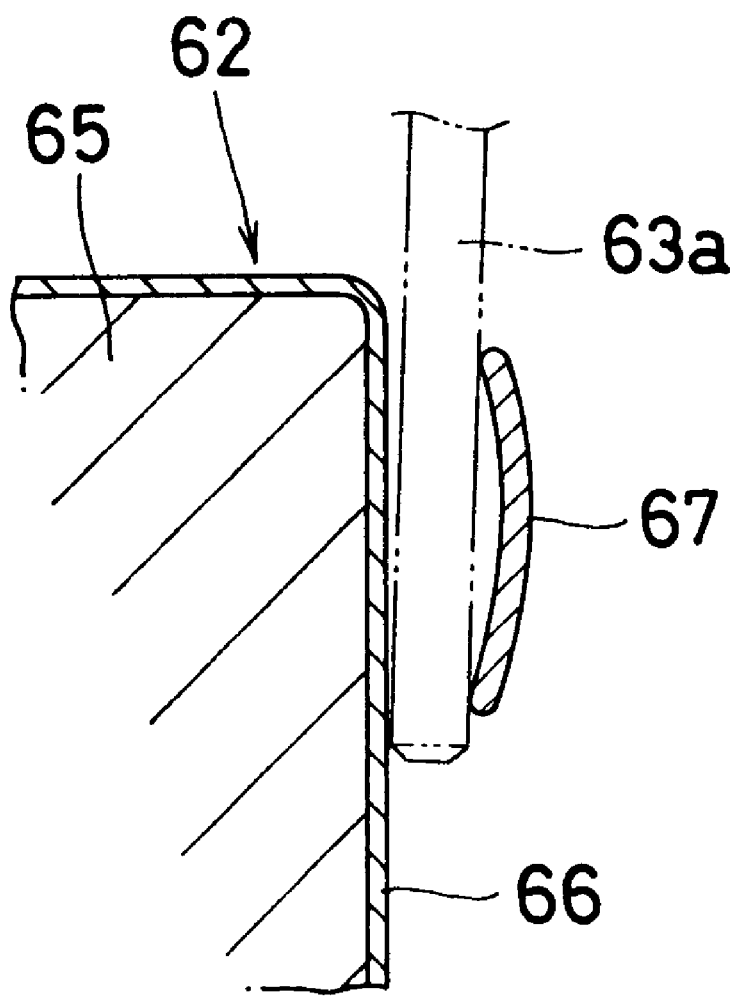
FIG. 7 is a cross-sectional view depicting in enlargement a part of the seat cushion in FIG. 6 where the stays of the head rest are to be fitted.

FIGS. 1 through 3 illustrate a head rest storage structure according to one embodiment of this invention. Inside a 4-wheel automobile in the drawings, a pair of right and left front seats 1 and a pair of right and left rear seats 2 are provided at some distance in the lengthwise direction of the vehicle therebetween. Each front seat 1 and each rear seat 2 respectively have seat cushions 3 and 4 for passengers, seat backs 5 and 6 which receive the backs of the seated passengers, and head rests 7 and 8 which are detachably installed into the upper end portions of the seat backs 5 and 6 and which support the heads of the passengers. The rear seats 2 are double folding type seats which can enlarge the baggage space at the back of the vehicle when needed.

This type of rear seat 2 is designed in such a way that the head rest 8 can be stored and held in the seat cushion 4 by pulling the seat cushion 4 up and frontward of the vehicle, folding the seat back 6 frontward (toward the front seat 1) with the head rest 8 detached from the upper end portion of the seat back 6, and then fitting two stays 8a of the detached head rest 8 into a rear portion 4a of the seat cushion 4, as indicated by arrows in FIG. 1.

For such retainment of the head rest 8, as apparent from FIGS. 2 and 3, the back of the seat cushion 4 is formed by a resin panel 9 which is stronger than the carpet, urethane form and the like and is integrally formed of a resin material that has a easier formability than metal. The resin panel 9 is provided with a recess 10 which protrudes outward. A pair of right and left cylindrical portions 11 which have bottoms and hold the stays 8a of the head rest 8 are provided integrally on the flat surface of this recess 10.

The cylindrical portions 11 extend vertically with lengths long enough to hold the stays 8a of the head rest 8, and are arranged at an interval across the resin panel 9 in association with the distance between the provided stays 8a of the head rest 8. A bottom 11a is formed at the lower end of each cylindrical portion 11 to receive the lower end portion of the associated stay 8a.

A bead portion 12 protruding toward the seat cushion 4 (inward of the associated cylindrical portion 11) is provided on the outer surface of each cylindrical portion 11 at a vertically midway thereof. With the bead portions 12 set in abutment against the associated stays 8a, rattling of the held head rest 8 during driving is suppressed.

An opening 13 for a punch-out job is provided in the resin panel 9 at a position corresponding to vertically midways of the cylindrical portions 11. Provided at the lower peripheral portion of the opening 13 is a guide portion 14 which is bent obliquely upward toward the seat cushion 4.

A plurality of windows 15 (two in this embodiment) are bored at intervals therebetween in the outer surface of, and along, each cylindrical portion 11. In this embodiment, the windows 15 are arranged vertically with the bead portion 12 in between, and the interior of each cylindrical portion 11 can be seen from outside through those windows 15.

According to the storage structure of this embodiment, the resin panel 9 of the seat cushion 4 is integrally provided with the pair of right and left cylindrical portions 11, and the stays 8a of the head rest 8 are held in the cylindrical portions 11 as one holding the head rest 8 inserts the stays 8a through the openings at the upper ends of the cylindrical portions 11 and pushes the stays 8a inside the cylindrical portions 11 until they lower ends of the stays 8a hit on the bottoms 11a and stop there. This structure can therefore store the head rest 8 firmly for a long period of time without using separate components like grommets or a webbing which is needed by the conventional storage structures.

In the storage structure according to this embodiment, since the bead portions 12 and the guide portion 14 are provided at vertically midway positions on the cylindrical portions 11, the stays 8a can easily be inserted inside the cylindrical portions 11 and can be held firmly while rattling of the held head rest 8 during driving is suppressed. What is more, one can confirm how the stays 8a are inserted, through the plurality of windows 15 provided in the outer surfaces of the cylindrical portions 11.

Although only one embodiment of the present invention has been described herein, it should be apparent to those skilled in the art that the present invention may be embodied and modified in many other specific forms without departing from the spirit or scope of the invention. For example, the cylindrical portions 11 may be designed to have other shapes than the illustrated one as long as they can firmly hold the stays 8a of the head rest 8.

What is claimed is:

1. A headrest storage structure for a motor vehicle seat, comprising:

a seat having a seat cushion angularly movable about a pivot, a seat back angularly movable to a folded forward position, a head rest removably attached to said seat back by at least one stay; and a resin panel forming the back of said seat cushion and including an integrally formed tubular portion for each stay configured to receive said stay for holding said head rest in a storage position, whereby when said head rest is received in said tubular portions when said seat cushion is pulled frontward and up said seat back can be folded frontward, and wherein said tubular portion includes at least one window in an outer surface thereof such that the stays are visible through the windows when said head rest is in the storage position.

2. The storage structure according to claim 1, wherein each said tubular portion includes a bead portion protruding inward and configured to engage the respective stay to aid in retaining said head rest in the storage position.

3. The storage structure according to claim 1, wherein each of said tubular portions includes a bottom positioned to be abutted by a free end of said stay when said stay is inserted into the tubular portion.

4. The storage structure according to claim 1, further comprising at least a second window formed in each of the tubular portions, the windows of each tubular portion being spaced apart along a length of the tubular portion.

5. A seat for a motor vehicle, comprising:

a seat cushion angularly movable from a generally horizontal position to a generally upright position in which a lower surface of the seat cushion faces in a rearward direction of the seat;

a seat back angularly pivotable from a generally upright position to a generally horizontal folded position;

a head rest removably attached to the seat back by at least one stay affixed to the head rest; and a resin panel affixed to the seat cushion and forming the lower surface thereof, the resin panel including an integrally formed tubular portion configured to receive and retain the stay of the head rest such that the head rest is retained in a storage position on the lower surface of the seat cushion when the seat cushion is in the upright position, wherein the tubular portion is formed in the resin panel such that the stay of the head rest is generally vertical when the seat cushion is moved into the upright position and the head rest is in the storage position.

6. The seat of claim 5, wherein the head rest includes a pair of stays, and the resin panel includes a pair of tubular portions for receiving and retaining the stays.

7. The seat of claim 5, wherein the tubular portion includes a bead which protrudes inwardly for engaging the stay to aid in retaining the head rest in the storage position.

8. The seat of claim 7, wherein the bead is positioned about midway along a length of the tubular portion.

9. The seat of claim 5, wherein the tubular portion has a bottom positioned to be abutted by a free end of the stay when the stay is inserted into the tubular portion.

10. The seat of claim 5, wherein the tubular portion includes at least one window through which the stay is visible when the stay is at least partially inserted into the tubular portion.

* * * * *

UNITED STATES PATENT AND TRADEMARK OFFICE
CERTIFICATE OF CORRECTION

PATENT NO. : 6,203,104 B1
DATED : March 20, 2001
INVENTOR(S) : Matsuo et al.

It is certified that error appears in the above-identified patent and that said Letters Patent is hereby corrected as shown below:

<u>Title page,</u>
Item [73], in the Assignee's address, "Shizuoka-Ken" should read -- Hamamatsu --.

Signed and Sealed this

Twenty-fifth Day of September, 2001

Attest:

*Attesting Officer*

NICHOLAS P. GODICI
*Acting Director of the United States Patent and Trademark Office*